(12) United States Patent
Roth et al.

(10) Patent No.: US 7,356,470 B2
(45) Date of Patent: Apr. 8, 2008

(54) TEXT-TO-SPEECH AND IMAGE GENERATION OF MULTIMEDIA ATTACHMENTS TO E-MAIL

(76) Inventors: Adam Roth, 176 Ludlow St., Apt. 2EF, New York, NY (US) 10002; Geoffrey O'Sullivan, 116 Suffolk St., Apt. 2, New York, NY (US) 10002; Barclay A. Dunn, 15 W. 12 St., #104, New York, NY (US) 10011

( * ) Notice: Subject to any disclaimer, the term of this patent is extended or adjusted under 35 U.S.C. 154(b) by 0 days.

(21) Appl. No.: 11/253,507

(22) Filed: Oct. 18, 2005

(65) Prior Publication Data

US 2006/0041430 A1 Feb. 23, 2006

Related U.S. Application Data

(62) Division of application No. 09/709,659, filed on Nov. 10, 2000, now Pat. No. 6,975,988.

(51) Int. Cl.
*G10L 21/00* (2006.01)
(52) U.S. Cl. ............ 704/270; 704/235; 704/260; 704/270.1; 704/276; 348/515; 434/185
(58) Field of Classification Search ........ 704/270–276, 704/201, 262, 231, 235, 260, 270.1; 345/643, 345/473; 435/185, 169; 348/515; 434/185
See application file for complete search history.

(56) References Cited

U.S. PATENT DOCUMENTS 4,260,229 A * 4/1981 Bloomstein .............. 352/50
4,884,972 A * 12/1989 Gasper .................. 434/185
5,434,910 A 7/1995 Johnson et al.
5,568,383 A 10/1996 Johnson et al.

(Continued)

FOREIGN PATENT DOCUMENTS

JP 11-312160 5/2001

(Continued)

OTHER PUBLICATIONS

Yabe et al., "Automatic Animation of Discussions in USENET", Proceedings of the Working Conference on Advanced Visual Interfaces (May 2000).

*Primary Examiner*—Vijay Chawan
(74) *Attorney, Agent, or Firm*—Morgan & Finnegan, LLP

(57) ABSTRACT

A multi-mail system and method is disclosed in which a sender may convey and a recipient can realize emotional aspects associated with substantive content of a multi-mail message by receiving a message that is more than textual in nature. Voice recognition technology and programmatic relation of sound and graphics may be used to produce a talking image. In one embodiment, the image may include the user's own visual and/or audio likeness. In an alternate embodiment, the image may comprise any available visual and/or audio display selected by the user. The multi-mail message may be inputted by a user in a text format and transposed into a format including the selected image and/or voice. In an alternate embodiment, a spoken message may be converted into a format including the selected image and/or voice. The formatted messages are then stored and/or transmitted via an email system or some other electronic network.

41 Claims, 18 Drawing Sheets

U.S. PATENT DOCUMENTS

| | | |
|---|---|---|
| 5,938,447 A | 8/1999 | Kirksey |
| 5,956,681 A * | 9/1999 | Yamakita .................... 704/260 |
| 5,960,099 A | 9/1999 | Hayes, Jr. et al. |
| 5,970,459 A | 10/1999 | Yang et al. |
| 6,014,625 A | 1/2000 | Lee |
| 6,035,273 A * | 3/2000 | Spies ......................... 704/270 |
| 6,052,663 A | 4/2000 | Kurzweil et al. |
| 6,062,863 A | 5/2000 | Kirsey et al. |
| 6,064,383 A | 5/2000 | Skelly |
| 6,088,040 A | 7/2000 | Oda et al. |
| 6,088,673 A | 7/2000 | Lee et al. |
| 6,091,956 A | 7/2000 | Hollenberg |
| 6,112,177 A | 8/2000 | Cosatto et al. |
| 6,160,540 A | 12/2000 | Fishkin et al. |
| 6,169,902 B1 | 1/2001 | Kawamoto |
| 6,253,167 B1 | 6/2001 | Matsuda et al. |
| 6,449,595 B1 * | 9/2002 | Arslan et al. ............... 704/235 |
| 6,539,354 B1 * | 3/2003 | Sutton et al. ............... 704/260 |
| 6,697,120 B1 * | 2/2004 | Haisma et al. ............. 348/515 |
| 6,766,299 B1 * | 7/2004 | Bellomo et al. ............ 704/276 |
| 6,772,122 B2 * | 8/2004 | Jowitt et al. ................ 704/270 |
| 6,975,988 B1 * | 12/2005 | Roth et al. .................. 704/260 |
| 2002/0007276 A1 * | 1/2002 | Rosenblatt et al. ......... 704/260 |

FOREIGN PATENT DOCUMENTS

| | | |
|---|---|---|
| KR | 2001 065751 | 7/2001 |
| KR | 2002-0003833 | 1/2002 |
| KR | 2002-023717 | 10/2004 |

* cited by examiner

TEXT-TO-SPEECH AND IMAGE GENERATION OF MULTIMEDIA ATTACHMENTS TO E-MAIL

This is a divisional application of prior application Ser. No. 09/709,659, filed Nov. 10, 2000 now U.S. Pat. No. 6,975,988, which is hereby incorporated by reference.

BACKGROUND OF THE INVENTION

1. Field of the Invention

The invention relates to electronic mail methods and systems and more particularly to electronic mail methods and systems using associated audio and visual techniques.

2. Background Information

Over the past decade, the use of electronic mail (email) has become a ubiquitous form of communication. Email has become among the primary methods of communications used in both business and social settings. Some of the advantages of communication by email are the ability to transmit messages instantly, the ability to transmit graphics, the ability to easily send messages to a large number of recipients, etc. Because of these (and other) advantages, transmitting messages by email is more efficient than other types of communication modes, such as telephone, facsimile, and the like.

Nevertheless, transmitting messages by email limits a sender's ability to convey emotions that may be associated with a message. For example, when sending a message, senders may wish to convey that they are angry, sad, happy, etc. Because the content transmitted by email is usually in a text format, it is difficult for a sender to convey emotions along with a message. Of course, certain punctuation (such as an exclamation point) or an emoticon may aid in conveying a sender's emotion, but the value of using these symbols is limited. For example, it is difficult to use symbols to convey humor, impatience, urgency, empathy, etc.

U.S. Pat. No. 6,064,383 to Skelley entitled "Method And System For Selecting An Emotional Prosody For A Graphical Character" is directed to a user interface element which enables a user to select an appearance for a character that corresponds with an emotion and an emotional intensity. Nevertheless, Skelley and the other existing prior art do not permit a full range of capability of expressing senses or emotions associated with a message transmitted over a network. For example, users are typically limited to a fixed number of characters, and are unable to easily display a likeness that resembles the user in a lifelike manner (with respect to audio and visual aspects) when sending such messages. Moreover, users cannot easily enter and choose among message content formats, be it text-based, audio, visual, etc., particularly with respect to the user's own likeness. Further, because transmitting messages by email has become so ubiquitous, it is desirable to have the ability to prepare such messages using a variety of devices and input techniques. Therefore, there is the need to devise a method and system in which a user can easily compose an email message with the ability to associate one or more multimedia components related to the message content. Additionally, there is the need to devise such a method and system wherein the user is not restricted to specific character choices, emotional displays, message formats or limited inputting techniques.

SUMMARY OF THE INVENTION

Accordingly, it is an object of the invention to provide a multi-mail system and method in which a sender may convey and a recipient can realize emotional aspects associated with substantive content of an email message by receiving a message that is more than textual in nature. Voice recognition technology and programmatic relation of sound and graphics may be used to produce a talking image. In one embodiment, the image may include the user's own visual and/or audio likeness. In an alternate embodiment, the image may comprise any available visual and/or audio display selected by the user.

The multi-mail message may be inputted by a user in a text format and transposed into a format including the selected image and/or voice. In an alternate embodiment, a spoken message may be converted into a format including the selected image and/or voice. The formatted messages are then stored and/or transmitted via an email system or some other electronic network.

BRIEF DESCRIPTION OF THE DRAWINGS

The foregoing features and other aspects of the invention are explained in the following description taken in conjunction with the accompanying figures wherein.

It is to be understood that the drawings are for illustration only and are not limiting.

DETAILED DESCRIPTION OF THE INVENTION

System of the Invention

Figure 1A:
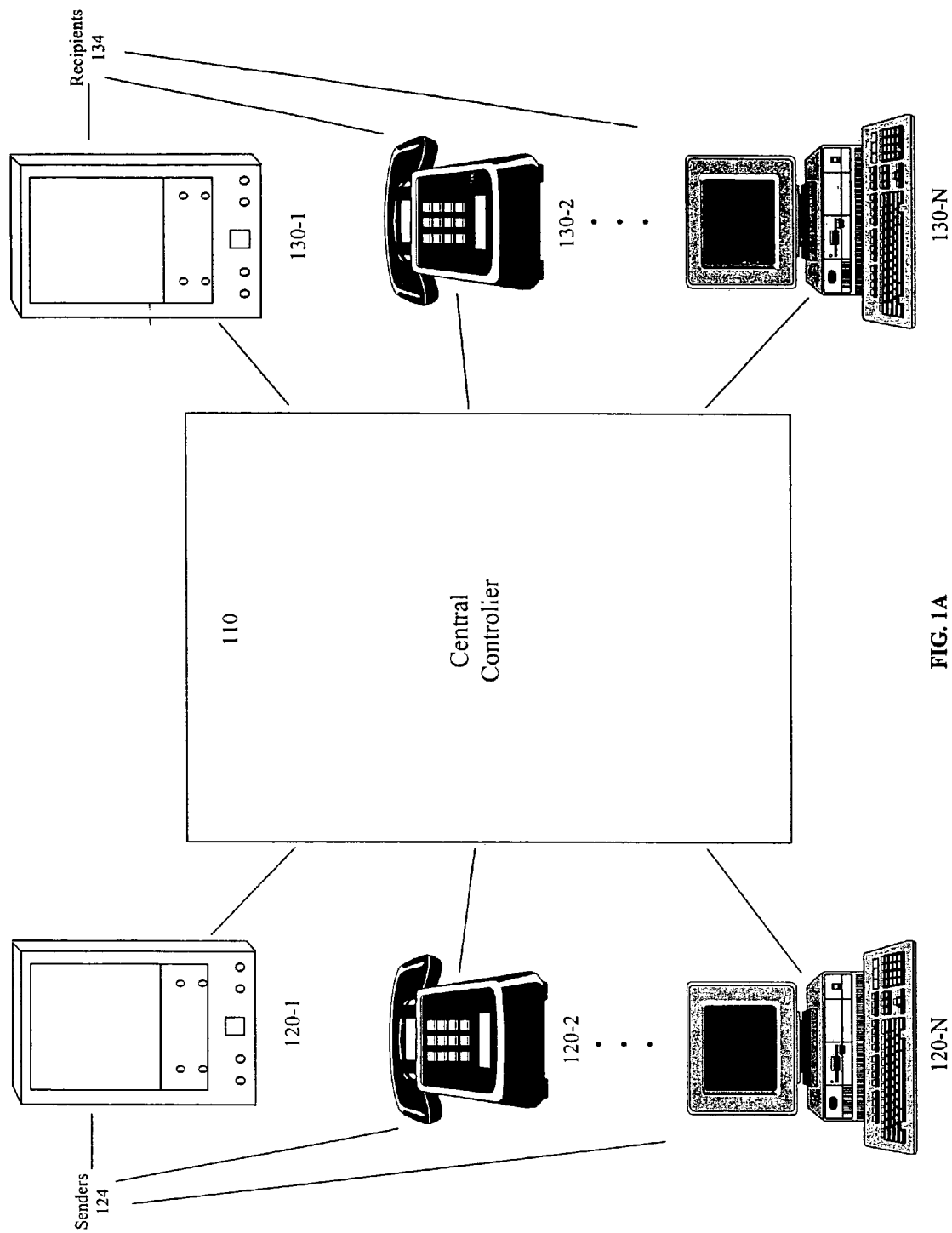
FIG. 1A illustrates a network for supporting transmission of email messages according to one embodiment of the present invention.

FIG. 1A shows one embodiment of a system incorporating the present invention. In this embodiment, the system includes a central controller 110, configured to receive information from one or more email senders 124 or to send such information to one or more recipients 134 at user interface devices 120, 130.

Central controller 110 preferably comprises a processor-based system that maintains databases and information relating to the preparation, transmission and receipt of multi-mail messages. A multi-mail message is an email message which has a multimedia component associated with the inputted message. The multimedia component may be in the form of audio content, image content (static or dynamic), graphic content or any other multimedia format. Further, the multi-mail message may be transmitted with a textual component in addition to one or more multimedia components, or, in an alternate embodiment, the textual component is replaced by one or more multimedia components. Although the multimedia component may be added to a message to facilitate conveying a user's emotion associated with a message, the component(s) may be utilized to simply more effectively transmit a sender's message.

As described more fully below, a multi-mail message may be prepared in a number of different ways. In one embodiment, an email message may be prepared by typing in a textual message at a sender's user interface device 120 that is capable of receiving such text, and associating an accompanying audio and/or video component. In another embodiment, an email message may be composed by telephone, or some other device that is capable of receiving an audio input. In one embodiment, user interface devices 120, 130 may be a computer comprising one or more central processing units (CPU), one or more data storage devices, a monitor, a keyboard and/or any other components that may allow a user to implement the commands of the software and hardware functions described herein. Further as FIG. 1A illustrates, a sender user interface device may be a personal digital assistant (PDA) 120-1, telephone 120-2, or any type of wireless or land-line device that is capable of transmitting textual, graphical or audio messages, such as facsimile machines, beepers, etc. Similarly, any devices that are capable of communicating an audio and/or video message (with or without transmitting textual data) are suitable for displaying email messages to a receiving party.

Figure 1B:
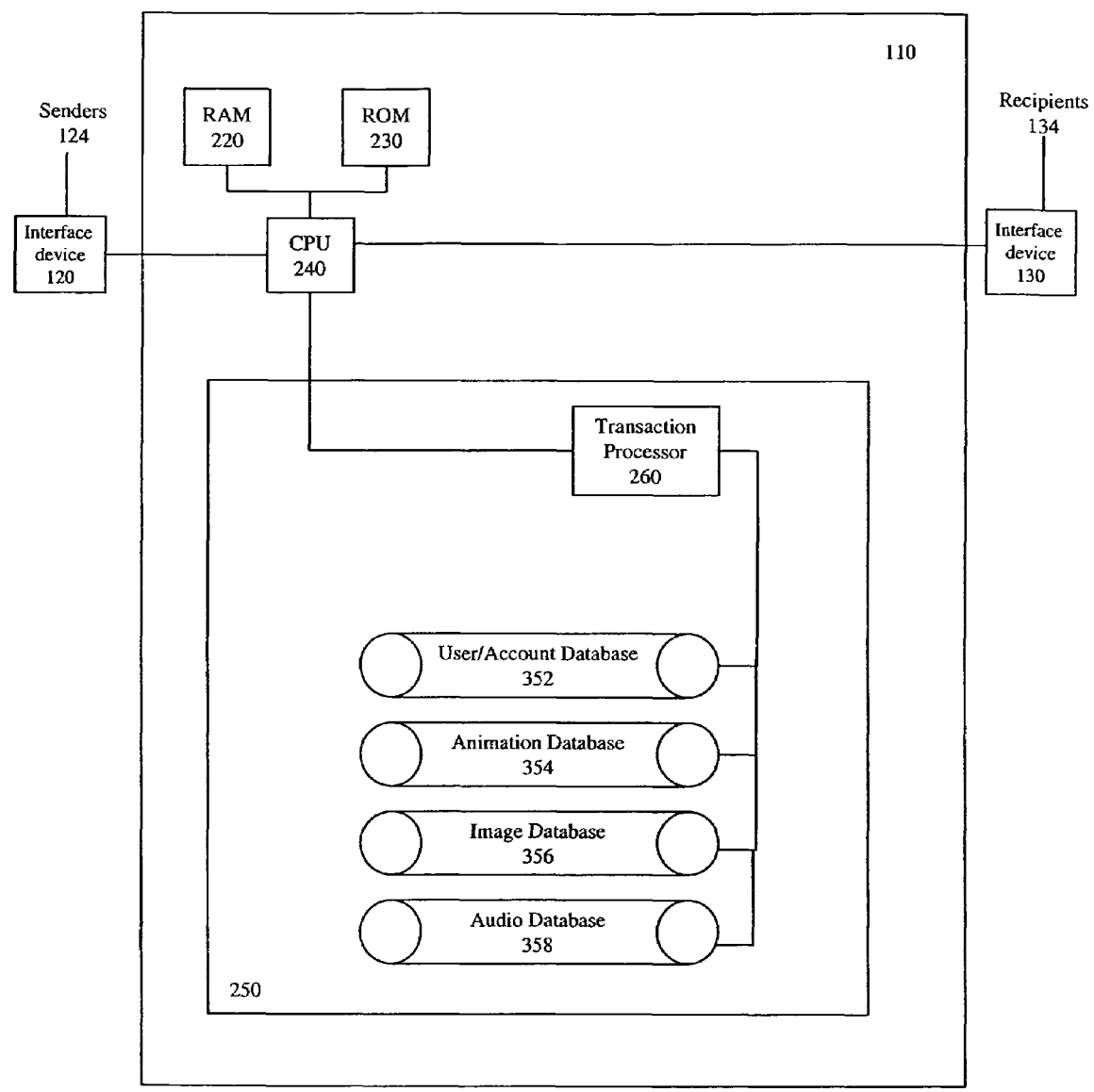
FIG. 1B illustrates one embodiment of the central controller used in the system shown in FIG. 1A.

Referring to FIG. 1B, central controller 110 stores information received from senders or recipients in user/account database 352. Further, information concerning animations, images and audio components which may be associated to a specific message and/or a specific user is stored in databases 354, 356, 358. As described more fully below this information is used to compose, send and receive multi-mail messages which convey the sender's message in a manner that is not only textual. In some cases, the multi-mail message may have no textual component at all. The data stored in databases 354, 356, 358 effectuate the transmission of such message formats. The structure of certain embodiments of the central controller 110 is described below in connection with FIG. 1B.

Senders 124 include individual(s) wishing to compose and/or send a multi-mail message to recipient(s) 134. As described above, a multi-mail message is an electronic message that has at least one multimedia component associated with the message. In one embodiment, users (senders 124 and recipients 134) register, through user interface devices 120, 130, with the service which performs the email processes as further described below. In one embodiment, the user interface device may be the user's computer or internet access device. In another embodiment, the user interface device may be a telephone, PDA, facsimile machine, etc. Senders 124 can input email message information in various ways. For instance, users may send such messages electronically by means of the Internet, World Wide Web, intranet, or some other network. This may be accomplished by inputting a message through sender device 120 which is in communication with the network. In an alternate embodiment, the sender device may be in communication with some other type of network, such as the public switched telephone network (PSTN). Two ways in which a sender may input such information via the PSTN for receipt by central controller 110 include (1) telephone answering services at central controller 110 that provide audio recording capabilities and, in some instances, that permit interaction between the user and the system based on touch tone or voice input provided by the user; or (2) telephoning live operators at central controller 110, to verbally provide information which is entered into the system via operator terminals.

FIG. 1B illustrates one embodiment of the central controller 110 for a system according to the present invention. As shown in FIG. 1B, central controller 110 includes central processing unit (CPU) 240, random access memory (RAM) 220, read-only memory (ROM) 230, and large capacity storage device 250. CPU 240, preferably comprising a conventional microprocessor such as an Intel Pentium Processor, is electronically coupled to each of the central controller's 110 other elements.

CPU 240 executes program code stored in one or more of RAM 220, ROM 230 and storage device 250 to carry out the functions and acts described in connection with central controller 110. CPU 240 preferably comprises at least one high-speed digital data processor adequate to execute program modules for executing email transmissions by others 124, 134. These modules are described in connection with FIGS. 2-17. CPU 240 interacts with RAM 220, ROM 230 and storage device 250 to execute stored program code according to conventional data processing techniques.

User interface devices 120 and 130 comprise devices for allowing central controller 110 to communicate with multi-mail senders 124 and recipients 134. Communication between these user interface devices 120, 130 and the controller 110 is preferably electronic by means of the Internet and preferably includes a conventional high speed modem employing known communication protocols capable of decrypting encrypted data received from the interface user devices 120, 130.

Large capacity storage device 250 contains transaction processor 260, user/account database 352, animation database 354, image database 356 and audio database 358. Transaction processor 260 maintains, determines and accesses data stored in databases 352, 354, 356, 358, and handles multi-mail message information for transmission between senders 124 and recipients 134 as described in connection with FIGS. 2-17. Transaction processor 260 may comprise a separate, conventional CPU/microprocessor, or a portion of the operating function of CPU 240.

User/account database 352 contains data about senders and recipients that register with the multi-mail service described herein. The data is used to store subscriber information including name and email address(es), as well as information for accessing audio, video and animation files, where appropriate. Animation database 354 contains information relating to animations associated with a sender or sender's message. Animation information includes data relating to a dynamic graphic associated with a sender's message. Image database 356 contains information relating to images associated with a sender or sender's message as well as data for controlling the audio and video aspects of a dynamic image. Image information may include any dynamic or static graphic associated with a sender's message. Audio database 358 contains information relating to audio data associated with a sender or sender's message. In one embodiment, the image may be a graphic of a user's, or someone else's, face. In an alternate embodiment, an image may be any other type of graphic. Audio information may include any voice(s) or sound(s) associated with a sender's message. As described more fully below, the animations, graphics and/or audio components associated with a sender's email message may include the likeness of the sender. In another embodiment, these multimedia components may have little or no resemblance to the sender. The process of using data from user/account information database 352, animation database 354, image database 356 and audio database 358 to prepare, send and receive messages, as well as the other operations of the system described with reference to FIGS. 1A and 1B, is represented in the flowcharts of FIGS. 2-17, described in detail below. Central controller 110 uses user/account information database 352, animation database 354, image database 356 and audio database 358 to execute multi-mail preparation and transmission processes.

Login Process

The login process is the preliminary process in which users (senders 124, recipients 134) provide information to effectuate access to the multi-mail system and serves at least the following purposes: (1) storing address information to enable proper routing of a multi-mail message; (2) transmitting messages (electronic, telephone, mail, etc.) by the multi-mail server to users such as new messages, return receipts, etc.; (3) effectuating login by comparing identifier information entered by users during the login process to the stored personal identifier information provided at registration; and (4) enabling users to select a link so that message information and/or user information may be stored.

Figure 2:
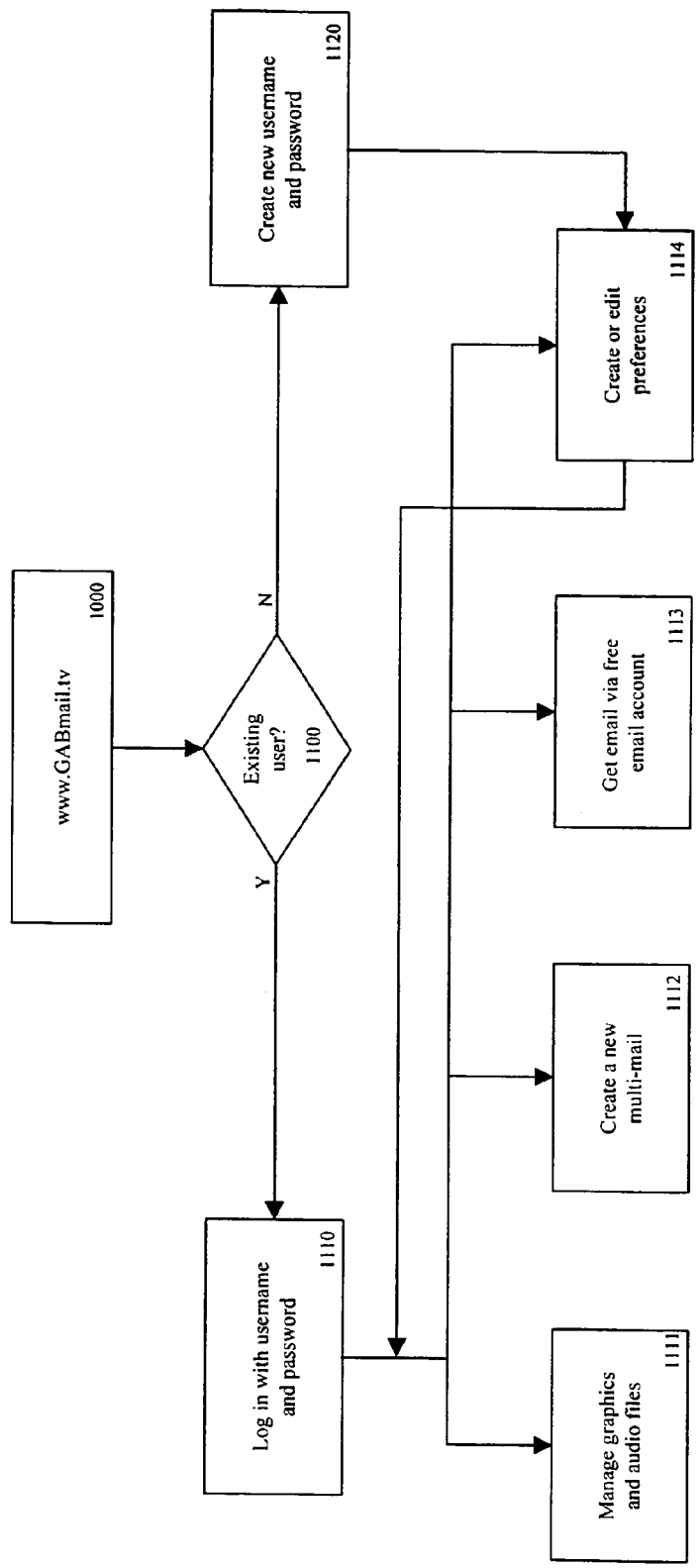
FIG. 2 illustrates the login process according to one embodiment of the invention.
Figure 3:
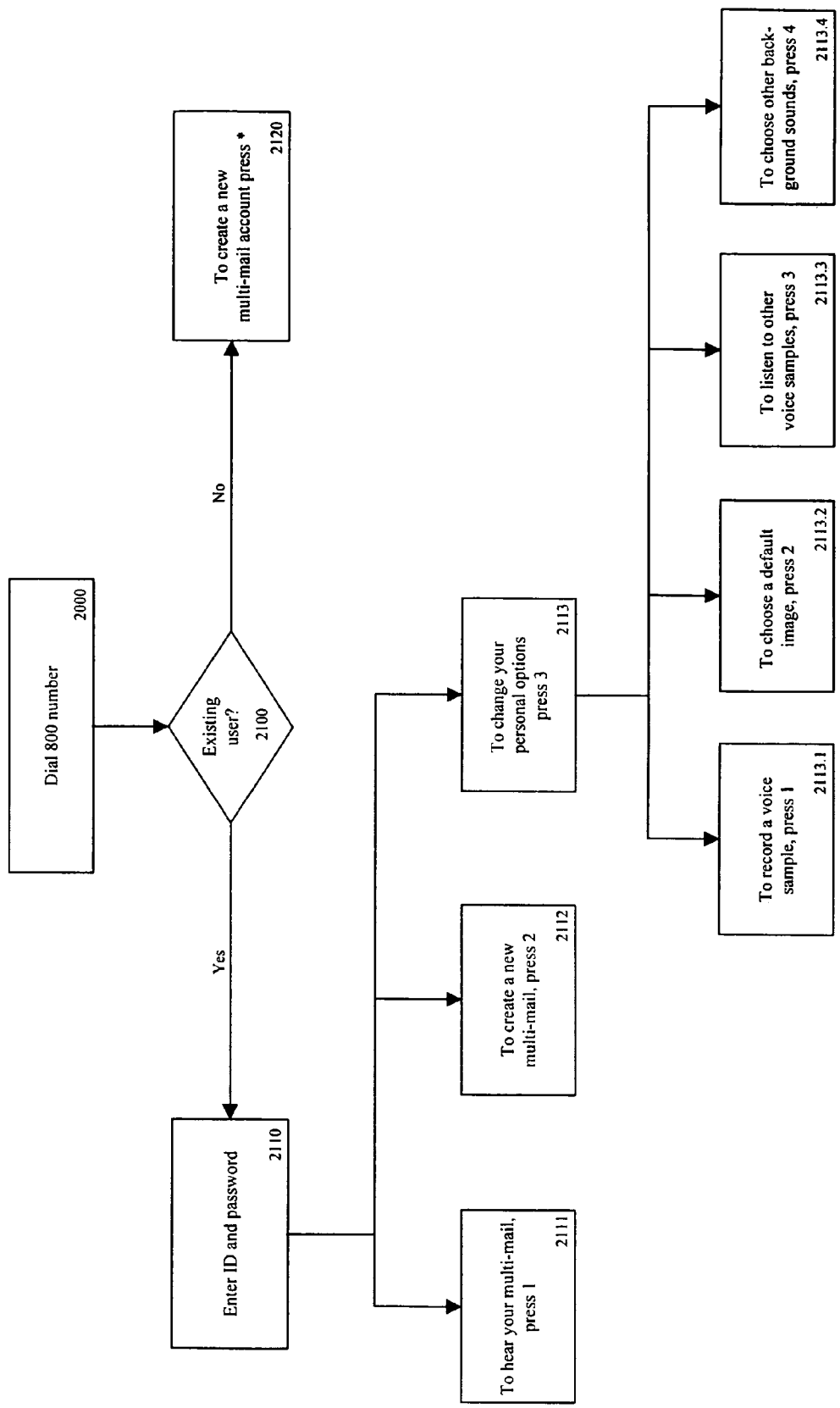
FIG. 3 illustrates the login process according to a second embodiment of the invention.

Referring to FIG. 2, the login process begins at step 1000 where a user accesses the multi-mail program stored in central server 110 via user interface 120, 130. In one embodiment, this is accomplished by typing a universal resource locator (URL) associated with the multi-mail site. A determination is then made, in step 1100, as to whether the user is an existing multi-mail user or a first time visitor. If the user has previously registered with the multi-mail site the user logs in by entering a username and associated password. This information is compared to the data previously stored in user/account database 352. Once the information is verified, the user may further access the multi-mail site.

Once the login information is verified as being correct, the user may access several options including, but not limited to, managing graphics and audio files (step 1111), creating a new multi-mail (step 1112), accessing multi-mail via a free multi-mail account (step 1113) and creating or editing user or multi-mail preferences (step 1114). Various aspects concerning managing graphics and audio files (step 1111) are described below with reference to FIGS. 4-11. Various aspects concerning creating a new multi-mail message (step 1112) are described below with reference to FIGS. 12-17.

Accessing multi-mail via a free email account (step 1113) allows a user to retrieve email sent to a personal email account at gabmail.tv, as well as email sent to them at other POP accounts. Finally, creating or editing preferences (step 1114) allows a user to select default settings associated with the user's account and/or messages. Such settings may include default audio, image and animation attributes, multi-mail routing information (i.e., priority information, forwarding information, etc.) and the like. The default settings may apply to all or only a sub-group (such as those to a specific recipient 134) of multi-mail messages created by a user.

If the user has not previously registered with the multi-mail site, a new username and password is established by the user and is stored in user/account database 352 (step 1120). The user may then create preferences associated with the user's new account and/or individual messages (step 1114). Upon creating these preferences, the user may manage graphics and audio files (step 1111), create a new multi-mail (step 1112), access multi-mail via a free multi-mail account (step 1113) and/or edit user or multi-mail preferences (step 1114).

Telephone Access Process

In addition to accessing the multi-mail system by computer, a user may access the system by telephone. (It should be noted that access to the multi-mail site is not limited only to computer and telephone access. These are merely representative samples of devices that may access the system by either some graphical user interface (i.e., computer) or by audio interface (i.e., telephone).

In step 2000, a user accesses the multi-mail system through the PSTN by dialing a telephone, such as a toll free 800 number. Upon accessing the system, the user specifies, in step 2100, whether they have an existing account. If an account does not already exist, the user may make such an indication by pressing a key on the telephone keypad (i.e., "*") or by speaking a predetermined word as requested by a multi-mail interactive voice response unit (step 2120).

If, however, CPU 240 of central controller 110 determines that a user account already exists, the user's identification code and password are entered and compared to the data stored in user/account database 352. Upon verification that the user's login information is correct, the user may access new (or old) received multi-mail messages (step 2111), compose a new multi-mail outgoing message (step 2112) or change the user's personal settings (step 2113). Changing a personal setting may include recording a new audio component to be associated with multi-mail messages (step 2113.1). This new audio component may be stored in audio database 358 in place of or in addition to any audio components that the user already has stored. Additional personal settings, such as choosing a default image (step 2113.2), listening to other voice samples (2113.3), or choosing background sounds (2113.4), may be activated by the telephone system. Other options, such as recording samples of a laugh, a whisper, a shout, or the like are available.

Graphics and Audio Management Process

Figure 4:
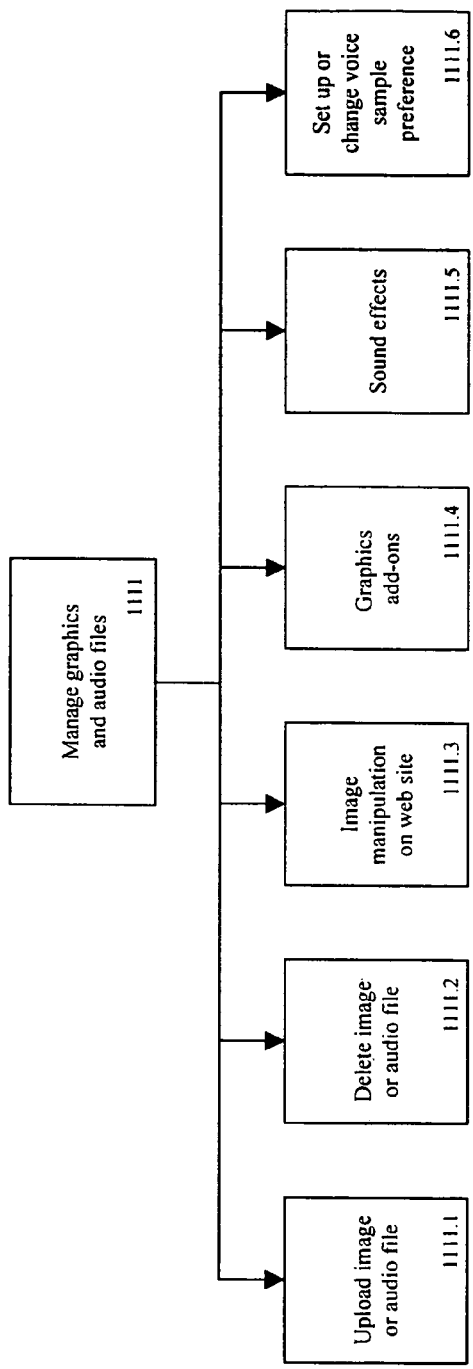
FIG. 4 illustrates the graphics and audio management process according to one embodiment of the invention.

Referring to FIG. 4, various audio and graphics capabilities of the multi-mail system are illustrated at step 1111. For example, at step 1111.1, image or audio files may be uploaded. As described above such files are stored in and may be accessed from any one or more of animation database 354, image database 356 and audio database 358. These files may be .wav, .jpeg, .mpeg, or any other type of file containing audio or video data. In addition to storing such files, these files may be deleted from database 354, 356, 358 at step 1111.2.

Images that can be accessed by a user may also be manipulated by the user. In one embodiment, the manipulation may take place at the multi-mail website (i.e., central controller 110) and may include enlarging or shrinking an image, reorienting the image, changing the colors of the image, tiling or cascading the image, etc. (see FIG. 7 and related description below for more detail). Further, at step 111.4, the graphics manipulation enables graphic add-ons which are described more fully below with reference to FIG. 8.

At step 1111.5, sound effects may be stored in and/or accessed from audio database 358. Sound effects may include changing the pitch, rate of speech, etc. of an existing message. Further, sound effects may include choosing from a library of common sounds including, but not limited to, the sound of breaking glass, wind blowing, door slamming, dog barking, etc. Another library of sound effects may be the voices of celebrities or other famous people. In other words, the sound effects may result from changes to a user's voice, another person's voice or any sound related or unrelated to a person's voice. Finally, at step 1111.6, a voice sample preference may be created or changed. Such preferences (1111.6) as well as the other graphic/audio management steps (1111.1-1111.5) are described more fully below with reference to FIGS. 5-10.

Uploading an Image or Audio File

Figure 5:
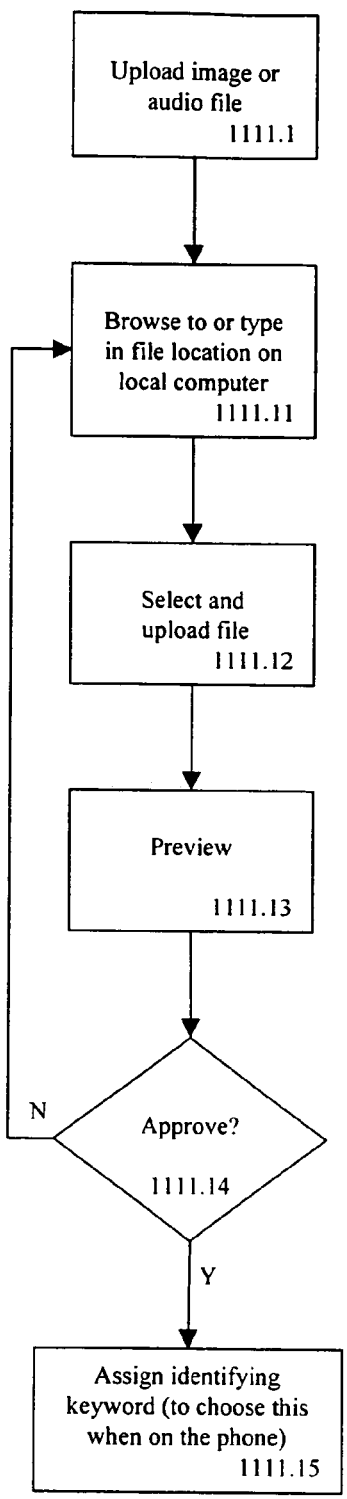
FIG. 5 illustrates the process of uploading an image or audio file according to one embodiment of the invention.

An image or audio component may be associated with a multi-mail message by accessing from database 354, 356, 358 the file(s) which store such data. Referring to FIG. 5, a user who wishes to upload an image or audio file (step 1111.1) may, in one embodiment, browse to or type in the file location on a local computer (or some other user interface device 120 which may browse or access such files) to locate such data files (step 1111.11) or terminate the upload session. Once the appropriate file is located, the user may select and upload the data of such file (step 1111.12). The sound, image or graphic component may then be previewed at step 1111.13. If the component is not approved (step 1111.14), the user may return to the browse mode (step 1111.11). If, however, at step 1111.14, the component is approved, it is associated with the message and the user returns to component management menu (step 1111). Further, a keyword may be associated with the file so that the contents of the file may be accessed via telephone 120-2.

Deleting an Image or Audio File

Figure 6:
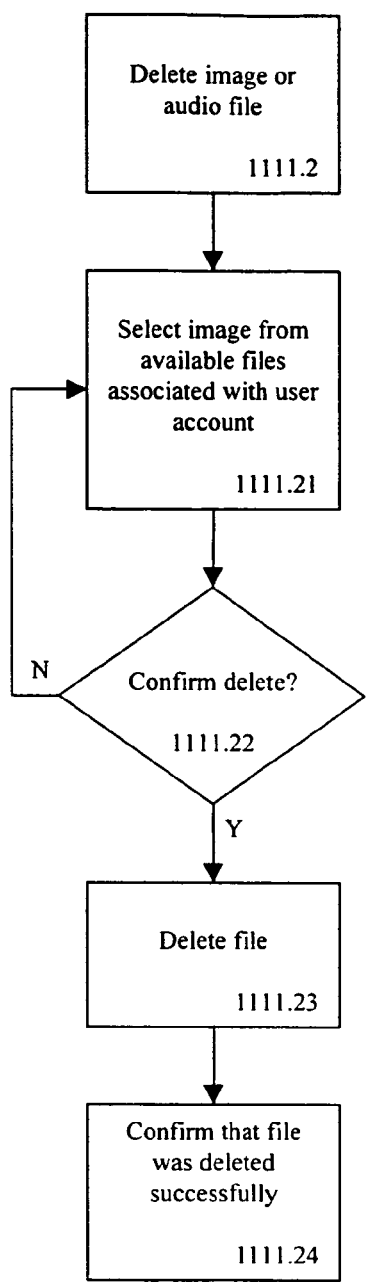
FIG. 6 illustrates the process of deleting an image or audio file according to one embodiment of the invention.
Figure 7:
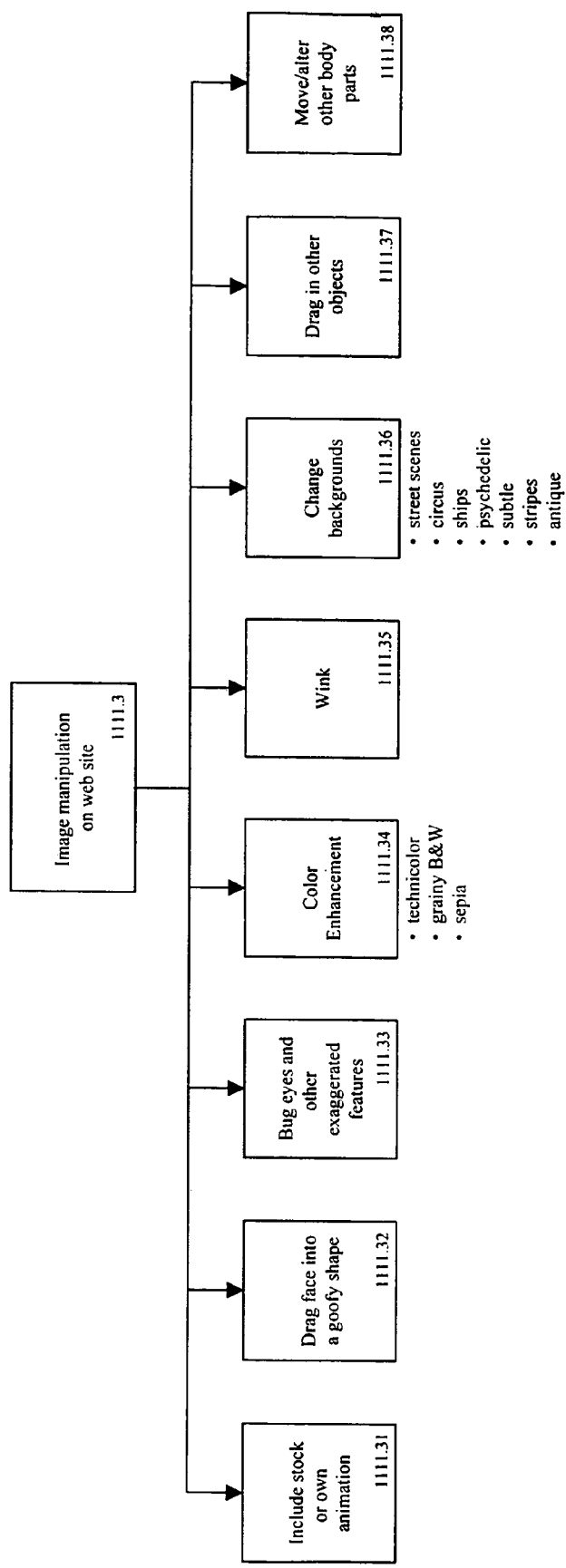
FIG. 7 illustrates the process of manipulating an image on a website according to one embodiment of the invention.

Referring to FIG. 6, a user may choose to delete one or more audio, image or animation files (step 1111.2). This is accomplished by first selecting an audio, image or animation from one or more available files stored in database 354, 356, 358 associated with the user's account (step 1111.21). Once the file(s) are selected, the user is asked to confirm the deletion of the file(s) (step 1111.22). If the selected file(s) are not confirmed for deletion, the user may choose to select other file(s) for deletion (or terminate the file deletion process). If, however, at step 1111.22, the user confirms deleting the selected file(s), those file(s) are deleted from one or more of databases 354, 356, 358 (1111.23) and the user receives confirmation of such deletion (1111.24). In one embodiment, the user is then returned to the component management menu (step 1111).

Manipulating an Image

As described above, a user may wish to manipulate an image for association with a multi-mail message. Such manipulation begins at step 1111.3 of FIG. 7. Image manipulation enables a user to easily change a stored image.

Although a user may change a stored image in countless ways, some of the manipulation options are as follows: (1) include stock or own animation which could, for example, include a mini-movie in the background behind the talking head (step 1111.31); (2) drag an image of a face into a goofy shape, (step 1111.32); (3) enlarge eyes or exaggerate other image features (step 1111.33); (4) provide color enhancement to an image or video (i.e., Technicolor™, grainy black and white, sepia, etc.) (step 1111.34); (5) enable image movement, such as winking (step 1111.35); (6) change component background (i.e., street scenes, circus, ships, psychedelic, subtle, stripes, antique, etc.) (step 1111.36); (7) drag other objects into image or video (step 1111.37); and (8) move or alter body parts (step 1111.38). The manipulations listed above are merely representative examples of the effects that may be applied to a multi-mail image or video components and are not meant to be an exclusive list of manipulations available. After completing the image/video manipulation (step 1111.3), the user may return to the component management menu (step 1111).

Graphic Add-On Process

Figure 8:
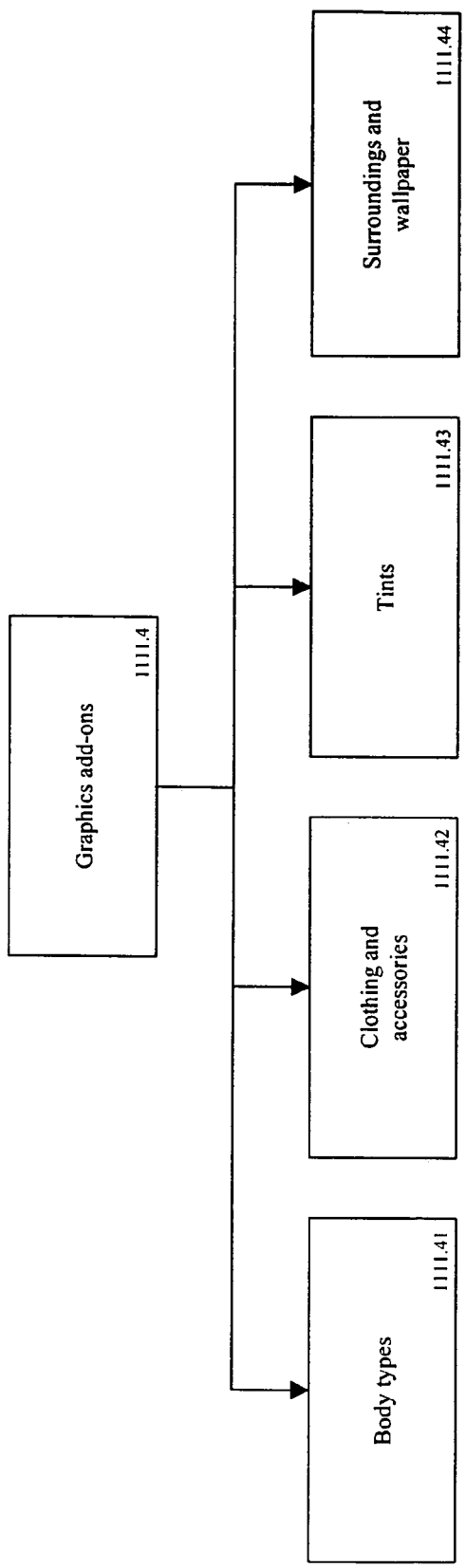
FIG. 8 illustrates the graphic add-on process according to one embodiment of the invention.

As shown in FIG. 8, a user may also wish to apply graphic add-ons to a multi-mail message (step 1111.4). These add-ons enable a user to introduce additional images into a graphic component. The additional image may already be stored in image database 356, may be accessed by some other database storing such images or may be scanned into the user's local user interface device 120. Although a user may access countless graphic add-ons, some of the add-ons that may be applied to a multi-mail message are as follows: (1) applying various body types, including different sizes and proportions, color (skin, hair, etc.), features, etc. (step 1111.41); (2) including different types of clothing and accessories to images of persons (step 1111.42); (3) applying different tints to the graphic (step 1111.43); and (4) applying different surroundings and wallpapers to the graphic (step 1111.44). The graphic add-ons listed above are merely representative examples of the add-ons that may be applied to a multi-mail image or video component and are not meant to be an exclusive list of the available graphic add-ons. After completing the graphic add-ons process (step 1111.4), the user may return to the component management menu (step 1111).

Sound Effect Process

Figure 9:
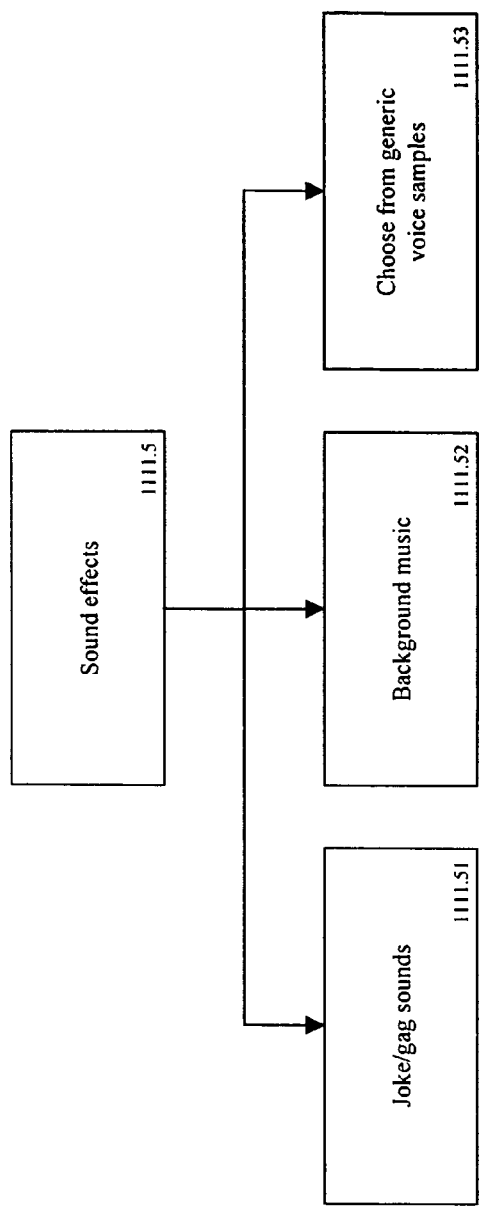
FIG. 9 illustrates the sound effect process according to one embodiment of the invention.

As shown in FIG. 9, a user may also wish to apply sound effects to a multi-mail message (step 1111.4). These sound effects enable a user to include either speech or non-speech sound that is associated with a multi-mail message. In one embodiment, the sound effect may simply be the user stating the textual contents of the multi-mail message using his or her normal voice. In another embodiment, the sound effect may be the user's speech attenuated to convey an emotion associated with the message. In yet another embodiment, the sound may be the speech of a person other than the user. Finally, in another embodiment, the sound effect may be some noise that is not speech. Some examples of the sound effects that may be applied to a multi-mail message are as follows: (1) applying joke or gag sounds (step 1111.51); (2) including background music (step 1111.52); and (3) choosing from generic voice samples (step 1111.53). The sound effects listed above are merely representative examples of the sounds that may be applied to a multi-mail image or video component. The sound effects may already be stored in audio database 358, may be accessed by some other database storing such sounds or may be recorded into local storage of a local user interface device 120 that is capable of receiving sound data. After completing the sound effects process (step 1111.5), the user may return to the component management menu (step 1111).

Establishing or Changing Voice Sample Preferences

Figure 10:
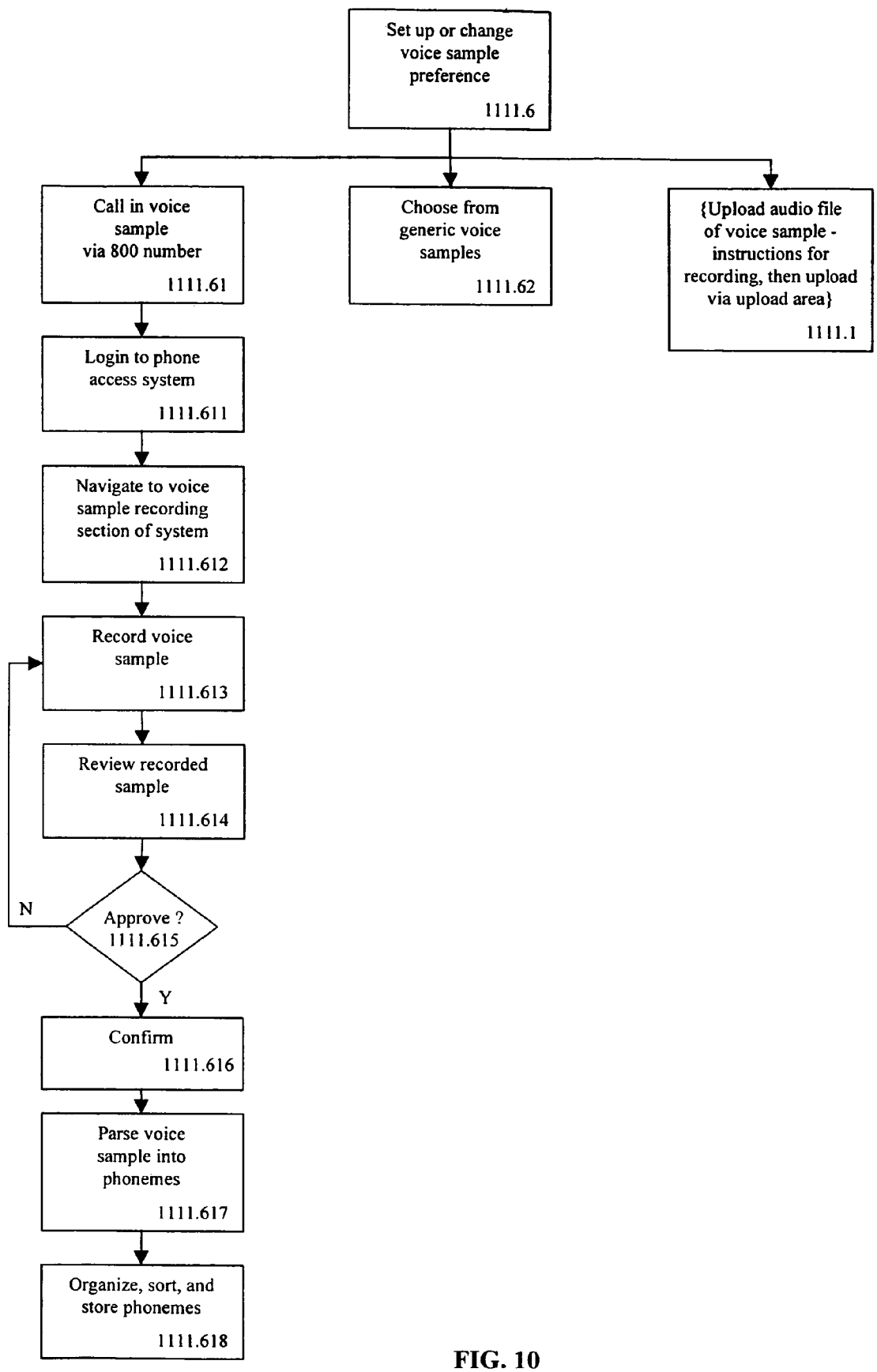
FIG. 10 illustrates the process of setting up or changing voice sample preferences according to one embodiment of the invention.

Referring to FIG. 10, voice sample preferences may be established or changed (step 1111.6). A voice sample is any voice that a user may store and/or access for association with a multi-mail message. As described more fully above, the voice may be that of a user, a variation of a user's voice, or someone else's voice.

In one embodiment, a voice sample may be stored in audio database 358 by telephone 120-2 or any other device having an audio input and output in communication with central controller 110. At step 1111.61, a user initiates the voice sample call in process by accessing a telephone number (such as a toll free telephone number) which is associated with the multi-mail message service. The user logs into the system by providing a username and password (step 1111.611). The user then navigates to a voice sample recording section of the system (step 1111.612). In one embodiment, this is accomplished by pressing the appropriate button on a keypad in response to the system requests. In an alternate embodiment, an interactive voice response unit may be used. At step 1111.613, the voice sample is recorded. Recording devices may be part of the telephone system. The user will read a statement into the phone that will provide a broad enough spectrum of sounds to allow the automated synthesis of any text the user may type in the future. The user may then review the recorded sample at step 1111.614. If the user does not approve of the recorded sample (step 1111.615), the process returns to step 1111.613 where the voice sample may be re-recorded (or the process may be terminated). If, however, the recording is approved, the user may confirm such approval (step 1111.616). The system saves and then parses the voice sample into phonemes (step 1111.617) and organizes, sorts and stores the phonemes (step 1111.618). More specifically, the system will (1) analyze sample for breaks (silence) and divide it into words at breaks; (2) divide words into syllables; (3) divide syllables into component vowel and consonant sounds, or phonemes; (4) identify each in the set of phonemes thus derived from voice sample by comparing to a standard set of spoken phonemes; and (5) eliminate duplicates, enumerate any missing phonemes, and organize collection for future use. At this point, a person's voice is stored in such manner that the multi-mail system may transmit a voice-based message to a recipient 134. In another embodiment, an audio component may be associated with a textual message by converting the textual message to an audio one. This may be accomplished by utilizing a text to speech converter which is known in the art.

In addition to calling in a voice sample (step 1111.61), a user may choose a voice sample from a generic voice sample stored in, for example, audio database 358 (step 1111.62). Further, an audio file may be uploaded as described above (step 1111.1).

Creating a New Message

Figure 11:
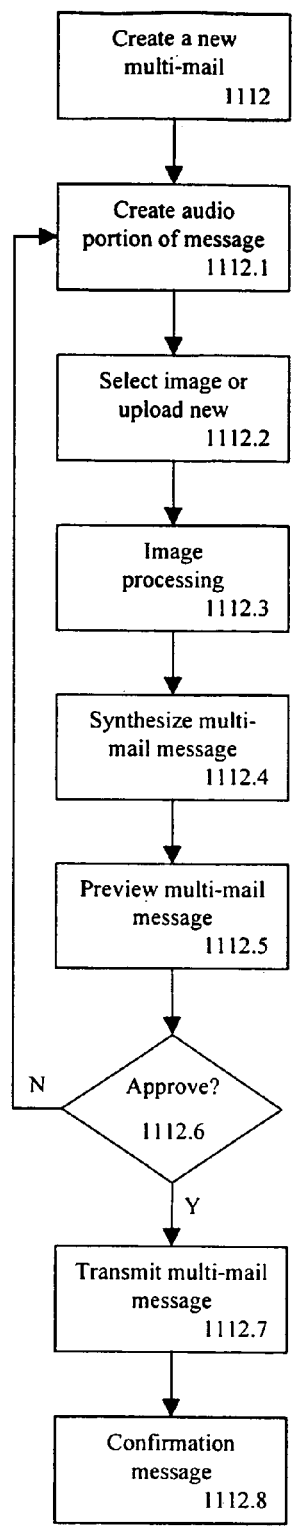
FIG. 11 illustrates the process of creating a new message according to one embodiment of the invention.
Figure 12:
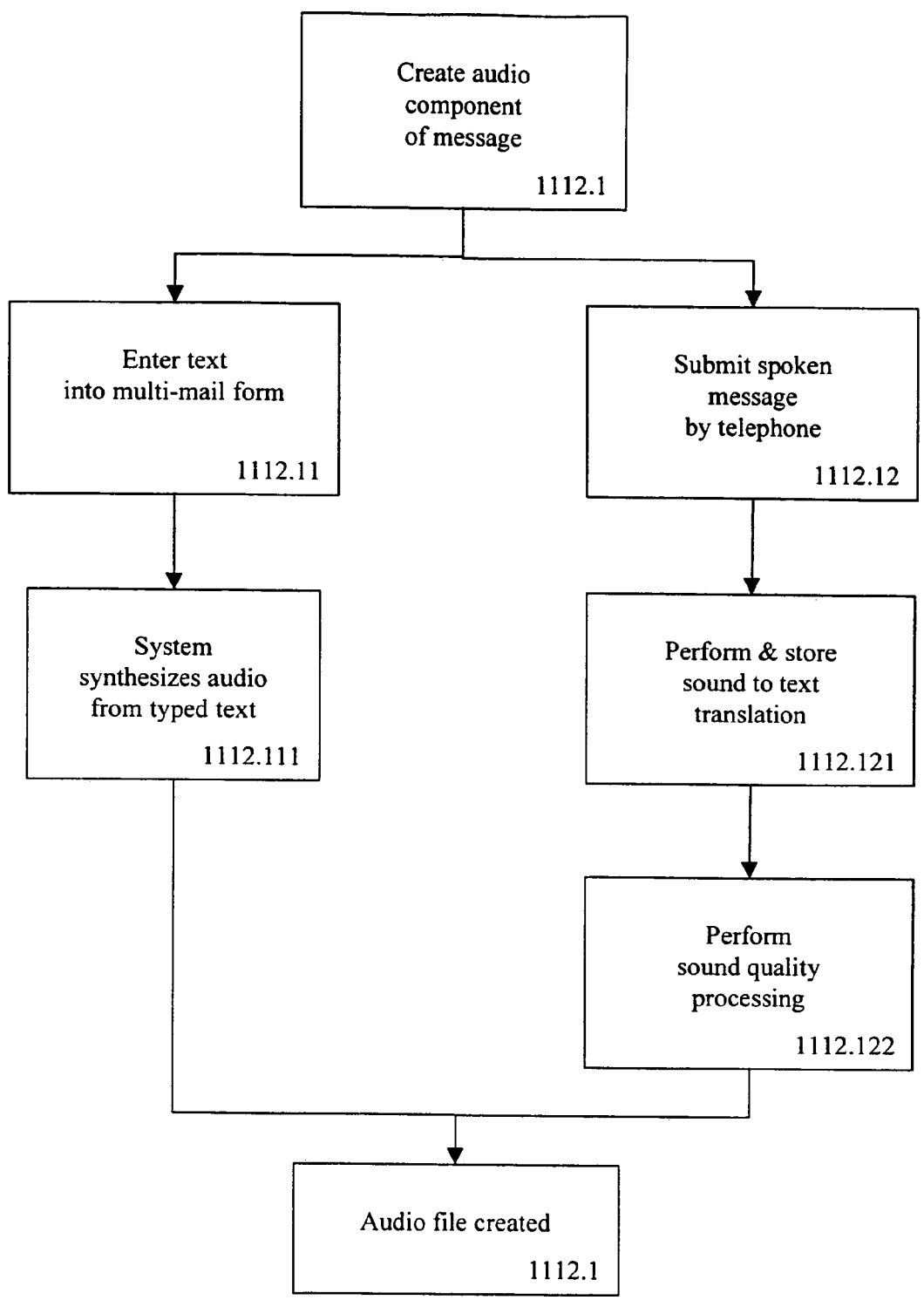
FIG. 12 illustrates the process of creating an audio portion of a message according to one embodiment of the invention.
Figure 13:
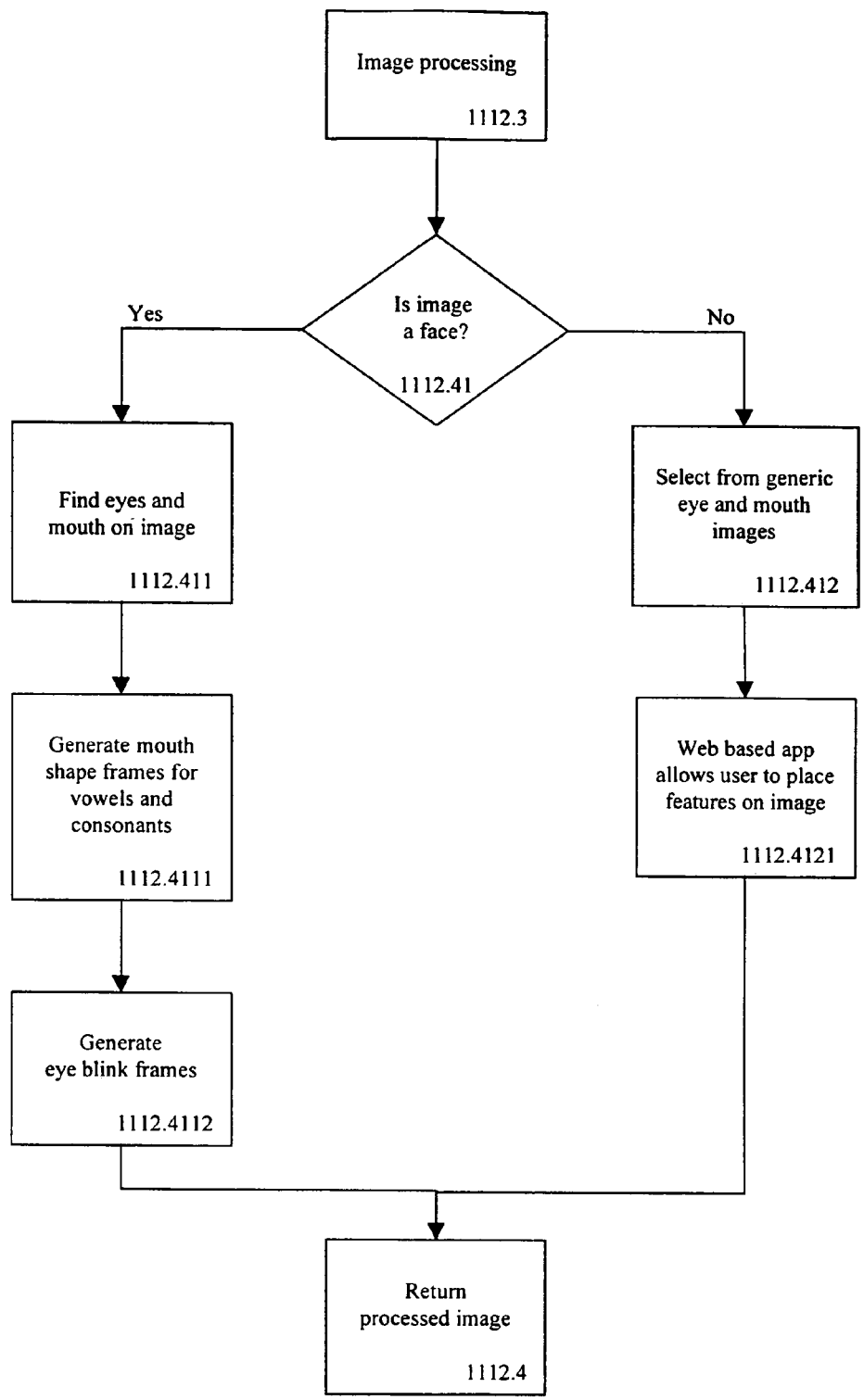
FIG. 13 illustrates the image processing process according to one embodiment of the invention.

Referring to FIG. 11, a user may create a new multi-mail message at step 1112. This is accomplished by (1) creating an audio portion (step 1112.1), (2) selecting a preexisting image or uploading a new image (step 1112.2), (3) processing the image (step 1112.3), and (4) synthesizing the multi-mail message (step 1112.4). Steps 1112.1-1112.4 are described in greater detail below with reference to FIGS. 12-17. It should be noted that although the multi-mail system supports all types of multimedia components (i.e., audio, image, animation, etc.), there is no requirement that more than one component be selected by the user. For example, the user may wish to add only an audio component, in the form of the user's voice, to an otherwise standard text email. Alternatively, the user may want to show a picture of an object in association with the message.

Once a multi-mail message has been composed with the appropriate associated audio, image and/or animation components, the user may preview the multi-mail message at step 1112.5. If the user does not approve the message (step 1112.6), the multi-mail message composition process may be terminated or the user may return to step 1112.1 where the message may be edited or created anew in part or in toto. If, however, at step 1112.6, the user approves the multi-mail message, the user may choose to transmit the multi-mail message (step 1112.7). In one embodiment, the message is transmitted as soon as the multi-mail message is approved. In an alternate embodiment, the user may choose an option to have the message sent either automatically or manually at some future time. In any event, when the message is transmitted, the user may select an option to receive a confirmation (step 1112.8) when the transmitted message has been sent by the sender 124 and/or received by the recipient 134.

Creating an Audio Portion of Message

As described above, a multi-mail message may include an audio component to more effectively convey a message. Creating the audio component of a message begins at step 1112.1 of FIG. 12. Entering the audio component of a multi-mail message into the mail system may be accomplished in at least two ways. In one embodiment, a sender 124 may enter text via user interface device 120 (step 1112.11). CPU 240 of central controller 110 may then synthesize the typed text into audio data which is stored in audio database 358 (step 1112.111). This is accomplished by using a text to speech converter in conjunction with the parsed voice sample stored in audio database 358 that is selected by sender 124.

In an alternate embodiment, the sender 124 may submit a spoken message by telephone 120-2 or some other device which has an audio input and output capability and is in communication with central controller 110 (step 1112.12). Next, central controller translates the sound to text by accessing a speech to text converter. The conversion is performed and saved at step 1112.121. Sound quality processing is performed at step 1112.122 and the audio component creations process is complete (step 1112.1).

Image Processing

As described above, a multi-mail message may include an image component to more effectively convey a message. Creating the image component of a message begins at step 1112.3 of FIG. 13. The image processing module enables a user to store his or her own likeness or that of another (using a digital camera, developing a standard photograph digitally onto a CD, scanning an image, or using some other digital input device) to more effectively convey a message. Further, the module enables the user to combine the audio component with a dynamic image component, to enable a recipient 134 to receive a message wherein a person's image and voice is conveying a message.

At step 1112.41, the user indicates to CPU 240 of central controller 110 whether the image is a face (step 1112.41). If the image is a face, the eyes and mouth are located (at step 1112.411). An image recognition application that looks for almond shapes (eyes), oval diamonds (mouths), or ovals (faces) may be either custom written or existent and known to those skilled in the art. Further, mouth shape frames are generated for each corresponding message vowel and consonant (step 1112.411) and eye blink frames are generated as well (step 1112.4112). The system includes custom written code that utilizes an algorithm or set of algorithms to make minute changes to an image, save in a new file, make more minute changes, save again in a new file, and so on until the collection of images together form the frames of animation to look like a speaking face. The images would then be compiled in order forming an animated sequence. If the image is not a face (or even if it is) the user may use a custom-written web-based application to denote regions of their image they would like to animate, and then select from a pre-determined collection of types of animation (blinking eyes, moving mouth, nodding head, or limited set of other non-facial movements) to apply to those regions of the image.

EMail Creation Process

Figure 14:
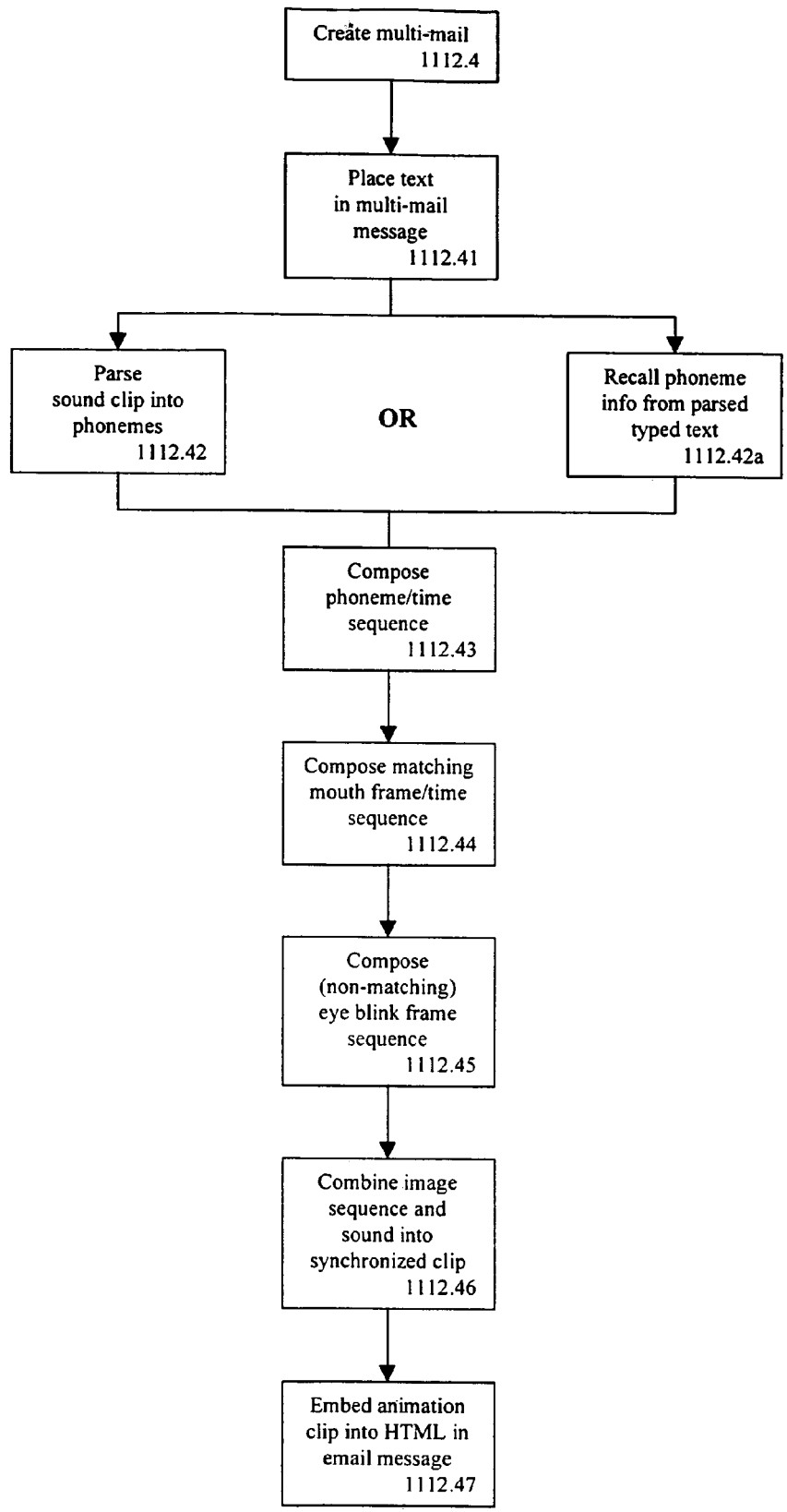
FIG. 14 illustrates the email creation process according to one embodiment of the invention.

Referring to FIG. 14, the multi-mail message is created at step 1112.4. In one embodiment, the text is first entered into the multi-mail message file (step 1112.41). Next, an associated sound clip is parsed into phonemes (step 1112.42) if the audio component was previously entered by telephone or a similar audio device. If, however, the message was originally typed in (i.e., textual), the phoneme information is recalled from the parsed typed text which is stored in image and audio databases 354, 358 (step 1112.41*a*).

Next, at step 1112.43, a phoneme/time sequence is composed by CPU 240. Further, a matching mouth frame/time sequence (step 1112.44) and a non-matching eye blink frame sequence (step 1112.45) are composed. The sequence of image frames is composed to match the sequence of phonemes, in order and in individual frame duration. The image sequence and sound information are then combined into a synchronized clip which is stored in animation database (step 1112.46). Finally, the animation clip is embedded into hypertext markup language (HTML) in a multi-mail message for transmission to a recipient's user interface device 130.

Text to Audio Synthesis Process

Figure 15:
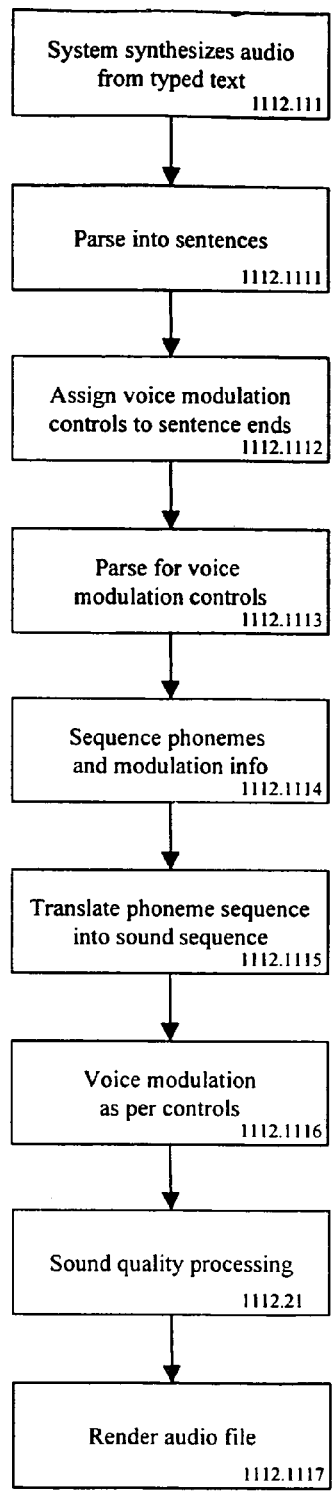
FIG. 15 illustrates the text to audio synthesis process according to one embodiment of the invention.

Referring to FIG. 15, the text to audio synthesis process is described. A sender most frequently enters an email message by typing in a text message which is displayed as a graphical user interface on the sender's user interface device 120 and then sent to a recipient's 134 user interface device 130. Because multi-mail messages have a multimedia component associated with the text message, the central controller converts the text message to an audio/image display to accompany and/or replace the text display. The synthesis enables such display to look and sound life-like. The text to audio synthesis begins at step 1112.111. First, central controller 110 parses the textual message into sentences. This may be accomplished by recognizing punctuation provided by the user or some other algorithm known in the art. Next, at step 1112.112, voice modulation controls are assigned to sentence end. This enables appropriate inflection and pausing to be accomplished as sentences end.

At step 1112.1113, the text is then parsed for voice modulation controls, or custom codes to indicate a variety of voice inflections or adjustments to be made on that sound. The sentence type (i.e., question, compound sentence, etc.), as well as emphasis commands provided by the sender 124, may dictate how the text is parsed. Next, phoneme and modulation information is sequenced and translated into a sound sequence (steps 1112.1114 and 1112.1115) and the voice is modulated pursuant to the modulation controls or commands (step 1112.1116). Using sound effect plug-in tools known to those skilled in the art, such as Mark of the Unicorn's Spectral Effects, the voice can be modulated in terms of pitch (higher or lower), formants (phoneme energy), or speed (time expansion or compression), to indicate a range and intensity of emotion. Finally, the sound quality is processed, at step 1112.21, and the associated multi-mail message audio file is compiled (step 1112.1117). The user may then send the message with the associated audio file; the associated text may be optionally transmitted. Further, as described above, an associated image file may also be associated with the message and transmitted.

Receiving Spoken Message by Telephone

Figure 16:
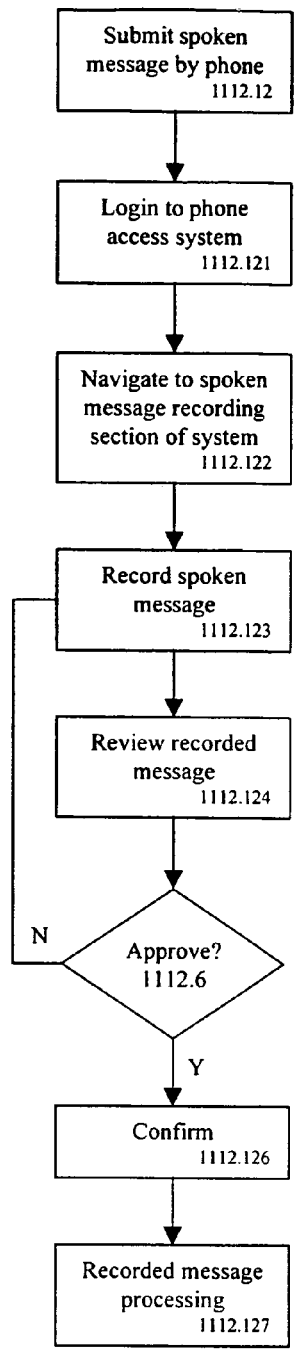
FIG. 16 illustrates the process of receiving a spoken message by telephone according to one embodiment of the invention.

Referring to FIG. 16, the process of receiving an audio message via telephone 120-2 or some other device having audio input and output capabilities is described. At step 1112.12, a sender 124 submits a spoken message by telephone 120-2. In one embodiment, the voice sample may be stored in audio database 358.

The user first accesses the system by calling a telephone number (such as a toll free telephone number) which is associated with the multi-mail message service. The user logs into the system by providing a username and password (step 1112.121). The user then navigates to a voice sample recording section of the system (step 1112.112). In one embodiment, this is accomplished by pressing the appropriate button on a keypad in response to the system requests. In an alternate embodiment, an interactive voice response unit may be used. At step 1112.123, the voice sample is recorded. The multi-mail message service system contains software whose function it is to digitize (i.e., record) sound. At the appropriate signal from the multi-mail message service, this software is invoked to record the user's voice sample. The user may then review the recorded sample at step 1112.124. If the user does not approve of the recorded sample (step 1112.6), the process returns to step 1111.123 where the voice sample may be re-recorded (or the process may be terminated). If, however, the recording is approved, the user may confirm such approval (step 1111.126). The system then performs the necessary recorded message processing (step 1112.127) as described in detail above with reference to steps 1111.617 and 1111.618 of FIG. 10.

Sound Quality Processing

Figure 17:
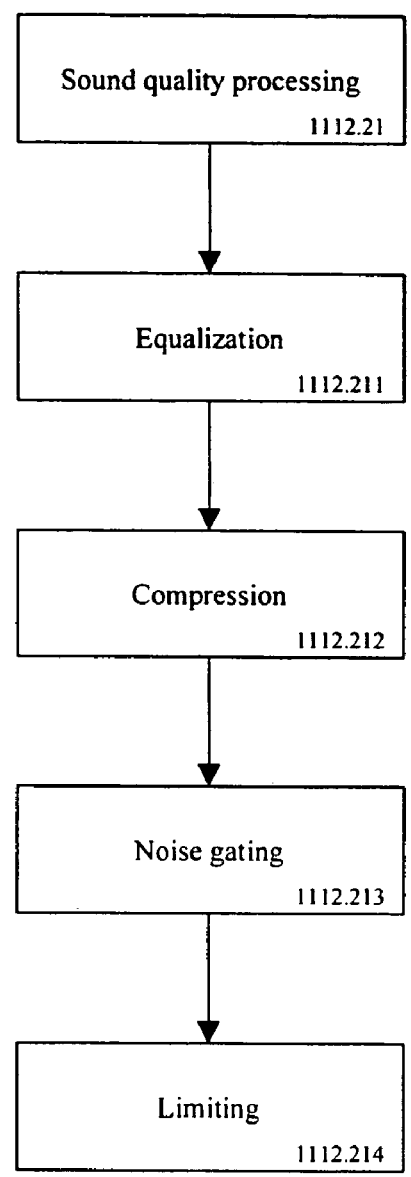
FIG. 17 illustrates the sound quality processing process according to one embodiment of the invention.

FIG. 17 illustrates the sound quality processing of the system shown in FIGS. 1A and 1B. Sound quality processing is comprised of the different modules that central controller 110 performs to the audio component of a multi-mail message to ensure that the sound has realistic qualities. At step 1112.211, the equalization process is performed to adjust individual sound wave frequencies. Next, at step 1112.212, central controller 110 performs the compression process, smoothing out sound wave peaks and compressing audio frequencies. Next, at step 1112.213, noise gating is performed, which further improves the sound quality by only permitting the audio component to pass if it reaches a certain user defined threshold, and an audio limiting process is performed by central controller 110, which limits the audio signal at a user defined level. These audio processes, eliminating background noise and other distortions and improving overall audio quality using methods known to those skill in the art, provide a high quality audio component to be communicated to a recipient 134.

It will be apparent to those skilled in the art that various modifications and variations can be made in the system and processes of the present invention without departing from the spirit or scope of the invention. Thus, it is intended that the present invention cover the modifications and variations of this invention provided they come within the scope of the appended claims and their equivalents. In this context, equivalents means each and every implementation for carrying out the functions recited in the claims, even if not explicitly described herein.

What is claimed is:

1. A method for preparing a multi-mail message for a user of a multi-mail system for transmission over a network, comprising:
    providing a database configured to store multimedia data that represent human emotions in order to assist the user in conveying an intended emotional context of the user's multi-mail message;
    receiving audio information relating to content of the multi-mail message from a first user; translating the audio information to text information;
    identifying a portion or portions of the text information, including individual words and or phrases, that can be associated with the intended emotional context of the user's multi-mail message;
    providing the user with an interface that enables the user to select one of the multimedia data from the database that matches with the intended emotional context of the user's multi-mail message;
    associating the portion or portions of the text information, including individual words or phrases, to the multimedia data suggested by a program of the multi-mail system and then selected by the user thereby generating the multi-mail message having a dynamic image; and
    transmitting the multi-mail message having the dynamic image to a recipient over the network thereby enabling the recipient to read, see and hear the intended emotional context of the user's multi-mail message.

2. The method according to claim 1, wherein the audio information is similar to sound generated by a user's voice.

3. The method according to claim 1, further comprising: generating sound similar to a generic voice sample based on received audio information.

4. The method according to claim 1, further comprising: generating one or more stored sounds based on received audio information.

5. The method according to claim 1, further comprising: creating one or more multimedia components associated with content of the multi-mail message.

6. The method according to claim 5, wherein the multimedia component comprises image information.

7. The method according to claim 6, wherein the image information may be static or dynamic.

8. The method according to claim 6, wherein synthesis of the image multimedia component further comprises: identifying speech movement image feature; and generating frames representing movement of said image features.

9. The method of claim 5, wherein the multimedia component comprises audio information and image information.

10. The method according to claim 9, wherein synthesis of the audio and image information of the multimedia component further comprises: composing a phoneme sequence; composing a mouth frame time sequence which matches the phoneme time sequence; composing speech movement image frame sequence; and combining the image information and phoneme sequences.

11. The method according to claim 9, further comprising: varying said multimedia component to convey one or more of the intended emotions the user wishes to convey in the content of the multi-mail message.

12. The method according to claim 11, wherein the intended emotional context of the user's multi-mail message is conveyed by manipulating one or more the image information.

13. The method according to claim 11, wherein the intended emotional context of the user's multi-mail message is conveyed by manipulating one or more the audio information.

14. A system for preparing a multi-mail message for a user of a multi-mail system for transmission over a network, comprising:
    means for providing a database configured to store multimedia data on common human emotions that enables the user to select an intended emotional context of a portion or portions of the user's multi-mail message;
    means for receiving audio information relating to content of the multi-mail message from the user;
    means for translating the audio information to text information;
    means for identifying a portion or portions of the text information, including individual words or phrases, that can be associated with the intended emotional context of the user's multi-mail message;
    means for providing the user with an interface that enables the user to select one of the multimedia data from the database that matches with the intended emotional context of the user's multi-mail message;
    means for associating the portion or portions of the text information, including individual words or phrases, to the multimedia data suggested by a program of the multi-mail system and then selected by the user thereby generating the multi-mail message having a dynamic image; and
    means for transmitting the multi-mail message to a recipient over the network thereby enabling the recipient to read, see and hear the intended emotional context of the user's multi-mail message.

15. The system according to claim 14, wherein the audio information is similar to sound generated by a user's voice.

16. The system according to claim 14, further comprising: means for generating sound similar to a generic voice sample based on received audio information.

17. The system according to claim 14, further comprising: means for generating one or more stored sounds based on received audio information.

18. The system according to claim 14, further comprising: means for creating one or more multimedia components associated with the intended emotional context of the user's multi-mail message.

19. The system according to claim 18, wherein the multimedia component comprises image information.

20. The system according to claim 19, wherein the image information may be static or dynamic.

21. The system according to claim 19, wherein synthesis of the image multimedia component further comprises: means for identifying speech movement image feature; and means for generating frames representing movement of said image features.

22. The system of claim 18, wherein the multimedia component comprises audio information and image information.

23. The system according to claim 22, wherein synthesis of the audio and image information of the multimedia component further comprises: means for composing a phoneme sequence; means for composing a mouth frame time sequence which matches the phoneme time sequence; means for composing speech movement image frame sequence; and means for combining the image information and phoneme sequences.

24. The system according to claim 22, further comprising: means for varying said multimedia component to convey one or more of the intended emotions the user wishes to convey in the content of the multi-mail message.

25. The system according to claim 24, wherein the intended emotional context of the user's multi-mail message is conveyed by manipulating one or more of the image information.

26. The system according to claim 24, wherein the intended emotional context of the user's multi-mail message is conveyed by manipulating one or more element of the audio information.

27. A system for preparing a multi-mail message for a user of a multi-mail system for transmission over a network, comprising:
  a database configured to store multimedia data that represent human emotions in order to assist the user in conveying an intended emotional context of the user's multi-mail message; and
  a central processing unit configured to receive audio information relating to content of the multi-mail message, translate the audio information to text information, identify a portion or portions of the text information, including individual words or phrases, that can be associated with the intended emotional context of the user's multi-mail message, provide the user with an interface that enables the user to select one of the multimedia data from the database that matches with the intended emotional context of the user's multi-mail message, associate a portion or portions of the text information, including individual words or phrases, to the multimedia data suggested by a program of the multi-mail system and then selected by the user thereby generating the multi-media message having a dynamic image, and transmit the multi-mail message to a recipient over the network thereby enabling the recipient to read, see and hear the intended emotional context of the user's multi-mail message.

28. The system according to claim 27, wherein the audio information is similar to sound generated by a user's voice.

29. The system according to claim 27, wherein the central processing unit is further configured for generating sound similar to a generic voice sample based on received audio information.

30. The system according to claim 27, wherein the central processing unit is further configured for generating one or more stored sounds based on received audio information.

31. The system according to claim 27, wherein the central processing unit is further configured for creating one or more multimedia components associated with the content of the multi-mail message.

32. The system according to claim 31, wherein the multimedia component comprises image information.

33. The system according to claim 32, wherein the image information may be static or dynamic.

34. The system according to claim 32, wherein the central processing unit is further configured for identifying speech movement image feature, and for generating frames representing movement of said image features.

35. The system of claim 31, wherein the multimedia component comprises audio information and image information.

36. The system according to claim 35, wherein the central processing unit is further configured for composing a phoneme sequence, for composing a mouth frame time sequence which matches the phoneme time sequence, for composing speech movement image frame sequence, and for combining the image information and phoneme sequences.

37. The system according to claim 35, wherein the central processing unit is further configured for varying said multimedia component to convey one or more of the intended emotions the user wishes to convey in the content of the user's multi-mail message.

38. The system according to claim 37, wherein the central processing unit is further configured for manipulating one or more the image information to convey the intended emotional context of the user's multi-mail message.

39. Computer executable software code stored on a computer readable medium, the code for preparing a multi-mail message for a user of a multi-mail system for transmission over a network, comprising:
  code to provide a database configured to store multimedia data that represent human emotions in order to assist the user in conveying an intended emotional context of the user's multi-mail message;
  code to receive audio information relating to content of the multi-mail message from the user;
  code to translate the audio information to text information;
  code to identify a portion or portions of the text information, including individual words and/or phrase, that can be associated with the intended emotional context of the user's multi-mail message;
  code to provide the user with an interface that enables the user to select one of the multimedia data from the database that matches with the intended emotional context of the user's multi-mail message;
  code to associate a portion or portions of the text information, including individual words and/or phrases, to the multimedia data suggested by a program of the multi-mail system and then selected by the user thereby generating the multi-mail message having a dynamic image; and
  code to transmit the multi-mail message to a recipient over the network thereby enabling the recipient to read, see and hear the intended emotional context of the user's multi-mail message.

40. A programmed computer for preparing a multi-mail message for a user of a multi-mail system for transmission over a network, comprising:
  a memory having at least one region for storing computer executable program code; and
  a processor for executing the program code stored in memory, wherein the program code includes:
    code to provide a database configured to store multimedia data that represent human emotions in order to assist the user in conveying an intended emotional context of the user's multi-mail message;
    code to receive audio information relating to content of the multi-mail message from a first user;
    code to translate the audio information to text information;
    code to identify a portion or portions of the text information, including individual words and/or phrases, that can be associated with the intended emotional context of the user's multi-mail message;
    code to provide the user with an interface that enables the user to select one of the multimedia data from the database that matches with the intended emotional context of the user's multi-mail message;

code to associate the portion or portions of the text information, including individual words and/or phrases, to the multimedia data suggested by a program of the multi-mail system and then selected by the user thereby generating the multi-media message having a dynamic image; and code to transmit the multi-mail message to a recipient over the network thereby enabling the recipient to read, see and hear the intended emotional context of the user's multi-mail message.

41. A computer readable medium having computer executable software code stored thereon, the code for preparing a multi-mail message of a user of a multi-mail system for transmission over a network, comprising:

code to provide a database configured to store multimedia data that represent human emotions in order to assist the user in conveying an intended emotional context of the user's multi-mail message;

code to receive audio information relating to content of the multi-mail message;

code to translate the audio information to text information; and code to identify a portion or portions of the text information, including individual words or phrases that can be associated with the intended emotional context of the user's multi-mail message;

code to provide the user with an interface that enables the user to select one of the multimedia data from the database that matches with the intended emotional context of the user's multi-mail message;

code to associate the portion or portions of the text information, including individual words or phrases, to the multimedia data suggested by a program of the multi-mail system and then selected by the user thereby generating the multi-media message having a dynamic image; and code to transmit the multi-mail message to a recipient over the network thereby enabling the recipient to read, see and hear the intended emotional context of the user's multi-mail message.

* * * * *